Nov. 7, 1933.  W. E. SKELTON  1,933,687
INCUBATOR
Filed Sept. 17, 1931    5 Sheets-Sheet 3
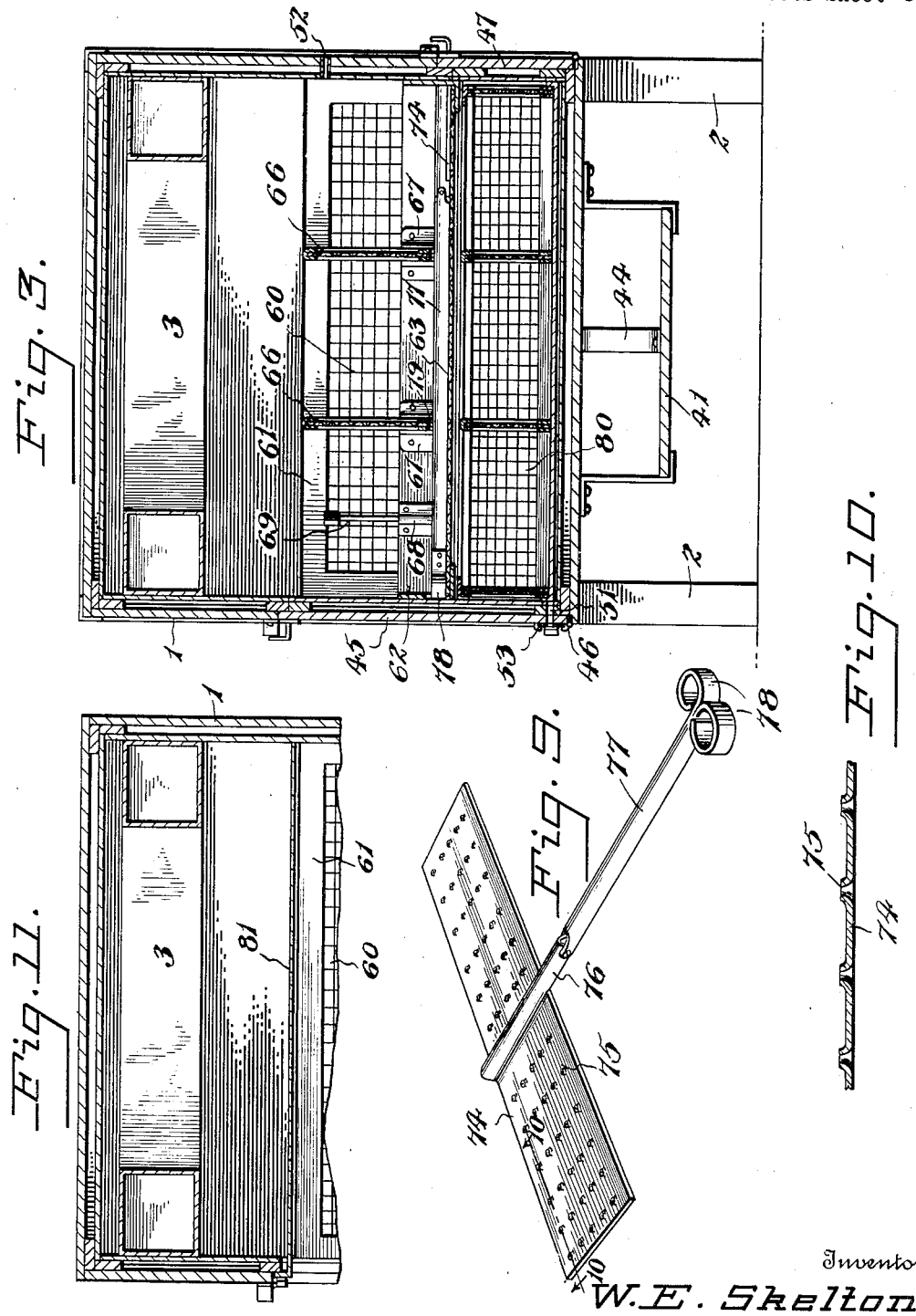
Inventor
W. E. Skelton
By Lacey & Lacey,
Attorneys

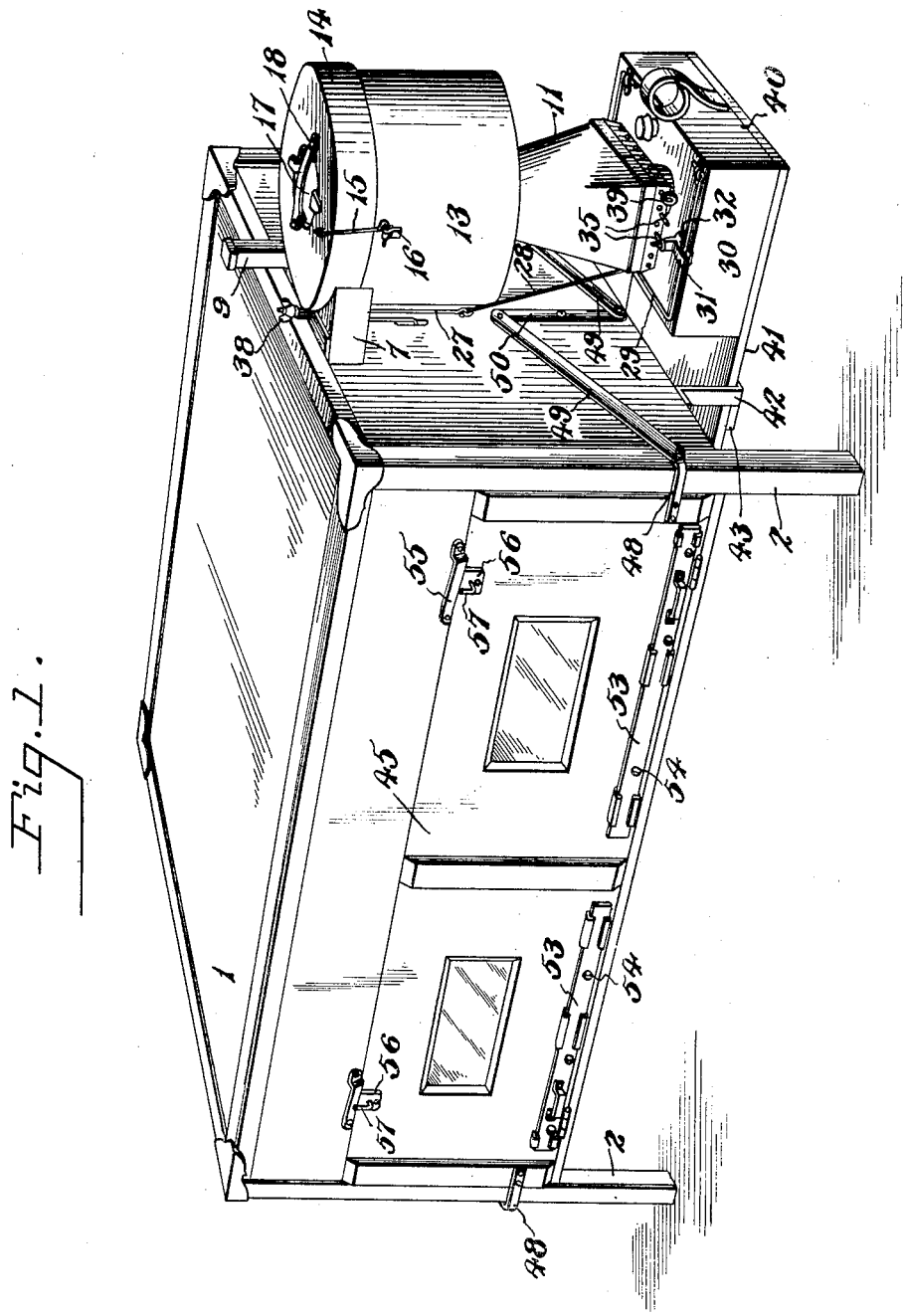

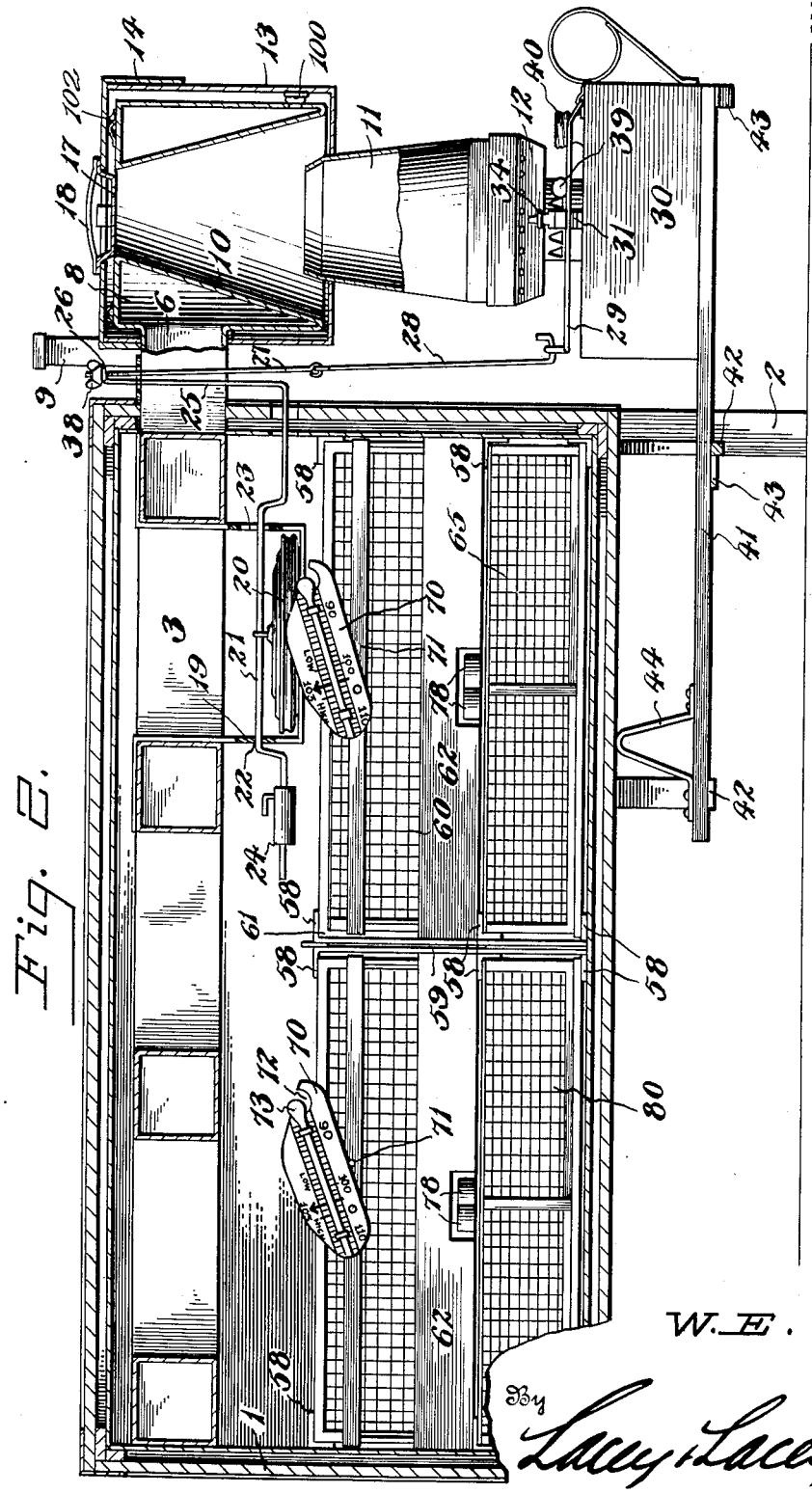

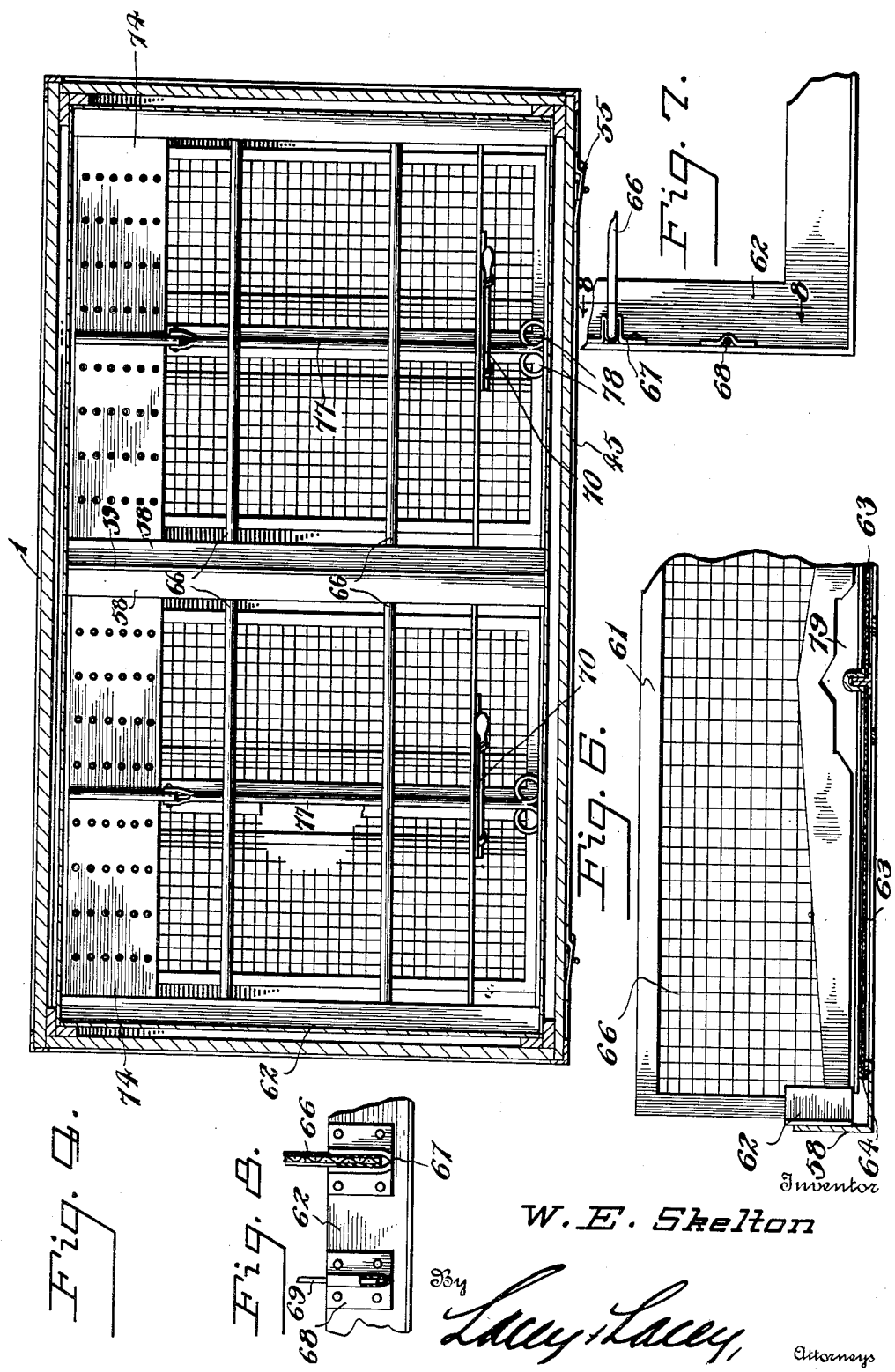

Nov. 7, 1933.   W. E. SKELTON   1,933,687
INCUBATOR
Filed Sept. 17, 1931   5 Sheets-Sheet 5
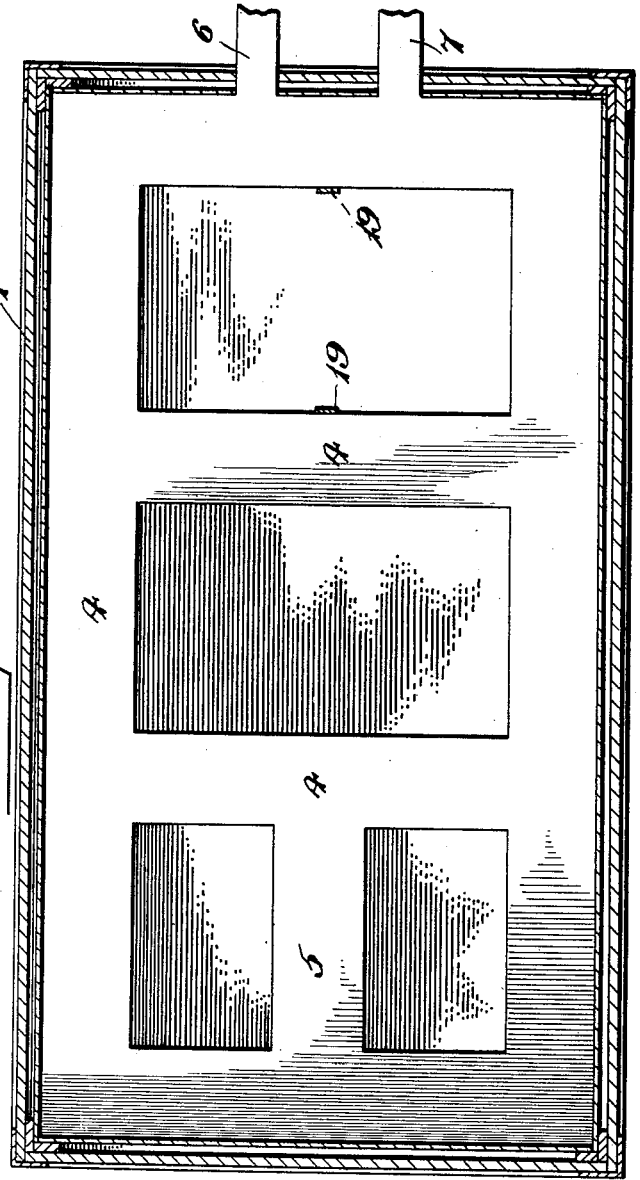
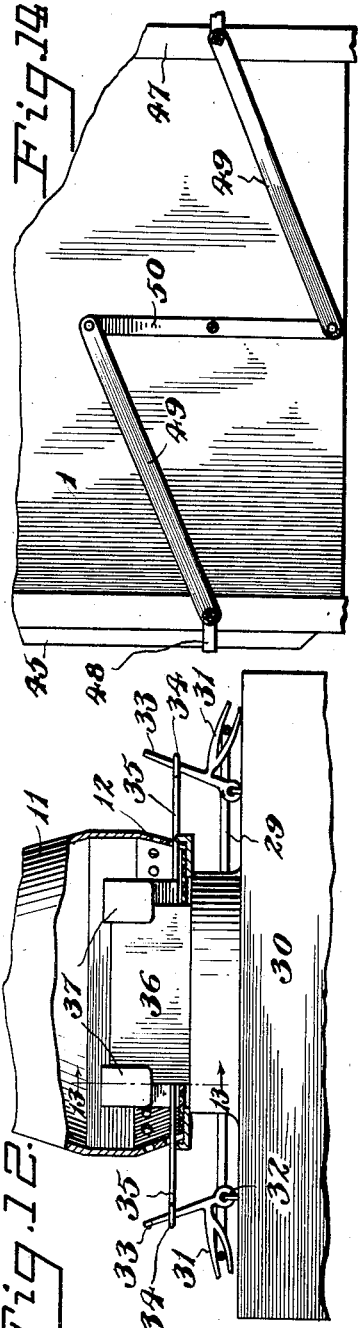
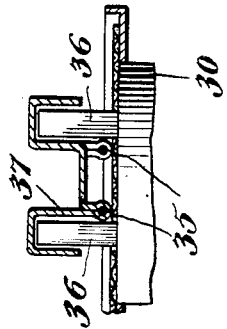
Inventor
W. E. Skelton
By Lacey & Lacey,
Attorneys Patented Nov. 7, 1933

1,933,687

UNITED STATES PATENT OFFICE 1,933,687

INCUBATOR

William E. Skelton, Lagrange, Ga.

Application September 17, 1931
Serial No. 563,392

4 Claims. (Cl. 236—4)

This invention seeks to improve the construction, ventilation and operation of incubators and, among other objects, it provides improved means for supplying heat to the incubator and conserving the heat during ventilating periods, provides improved means for regulating the heat, and provides effective means for turning the eggs and improved egg trays whereby the handling of the eggs will be facilitated and loss minimized and the young chicks will be permitted ready access from the egg trays to the nursery trays. The invention is illustrated in the accompanying drawings and consists in certain novel features which will be hereinafter first fully described and then more particularly defined in the appended claims.

In the drawings,

Figure 1 is a perspective view of an incubator embodying the present invention,

Fig. 2 is a central longitudinal vertical section of the same,

Fig. 3 is a transverse vertical section,

Fig. 4 is a horizontal section taken just above the egg trays,

Fig. 5 is a horizontal section taken just above the heating tank,

Fig. 6 is an enlarged sectional elevation of one of the egg trays,

Fig. 7 is a detail plan view of one corner of an egg tray,

Fig. 8 is a detail sectional elevation on the line 8—8 of Fig. 7,

Fig. 9 is a detail perspective view of the egg turner,

Fig. 10 is an enlarged detail section on the line 10—10 of Fig. 9,

Fig. 11 is a transverse section of a portion of the incubator, more particularly showing the shields or heat protectors whereby heat is retained in the upper portion of the incubator during ventilating periods, Fig. 12 is an enlarged detail sectional elevation of the lamp burner, Fig. 13 is a section on the line 13—13 of Fig. 12, and Fig. 14 is a detail elevation showing the connections between the front and rear doors of the incubator.

The incubator includes a body or casing 1 which is preferably of rectangular form and is supported upon legs 2 in the usual manner. As indicated in the several sectional views, the body is preferably of the double wall construction which has been found advantageous in conserving the heat and tending to maintain the desired temperature within the apparatus. A hot water tank 3 is mounted in the upper portion of the body or housing 1 and, as shown most clearly in Fig. 5, this tank comprises pipes 4 extending around the sides of the body and across the same and an additional pipe 5 extending longitudinally of the body at the end thereof remote from the heater. The tank has branch pipes 6 and 7 extending through one end wall of the body or casing to communicate with a drum 8, and a filler pipe 9 rises from the branch tube or pipe 6 to facilitate the filling of the tank with water when the incubator is to be put in use. The drum 8 is preferably circular and has a conical tubular open-ended core 10 extending vertically therethrough and receiving the upper end of a globe or chimney 11 rising from the burner 12 of the lamp or heater. The pipes which connect the sides of the tank and extend around the walls of the incubator casing are illustrated as of rectangular cross section, but it is to be understood that they may be of circular cross section, if desired. The heating drum 8 is enclosed by a jacket which has a lower portion 13 closely encircling the drum and having an opening through its bottom which will closely fit the upper end of the lamp chimney 11. An upper portion or lid 14 fits over the upper end of the drum 8 and around the upper end of the lower jacket member 13 and is provided with a central opening which alines with the upper end of the conical core of the drum when the parts are assembled, as shown in Fig. 2. Hooks 15 are secured on the upper jacket member 14 and arranged to engage eyes or keepers 16 on the lower section 13 and thereby hold the sections together and also support the entire jacket from the top of the drum. An outlet nozzle 100 is provided at a convenient point of the drum so that the water may be drained from the system when the incubator is to be put in storage, and this nozzle also serves to maintain the jacket in spaced relation to the drum. For this same purpose spacers 102 are provided on the top of the drum. A damper 17 is fitted in the upper end of the core 10 and may be held therein by a strap 18 passing thereover and secured upon the upper jacket section 14, as clearly shown in Figs. 1 and 2. This damper 17 is intended to remain in closed position as long as the apparatus is in use, so that the heat from the lamp will not be permitted to pass directly through the core but will be caused to play upon the entire inner surface of the same and pass under and circulate around the drum within the jacket and eventually escape over the damper through the opening in the top of the jacket whereby the heat will be transferred to the water in the drum and the heating tank and the water economically maintained at the desired temperature. If, for any reason, there should be an accumulation of smoke which is proving detrimental, the damper 17 may be temporarily removed and the smoke permitted to escape until the desired normal conditions are restored.

In the upper portion of the housing or casing of the incubator is a bracket or frame 19 which may be conveniently supported by the tank 3, as shown in Fig. 2, and upon this bracket is secured a thermostat 20, of any known or approved form, which is arranged to act directly upon a lever 21 extending across the thermostat and connected therewith. The lever is fulcrumed in one side of the bracket 19, as indicated at 22, and passes through a vertical slot 23 in the other side of the bracket whereby the movements of the lever will be accommodated. Adjacent its fulcrum, the lever is equipped with a counterweight 24 whereby its oscillations are rendered smooth and easy, and, at the opposite side, the lever is extended through openings provided therefor in the end wall of the casing and is then turned upwardly, as shown at 25, between the casing and the heating drum. The extremity of the upturned portion 25 is formed into an eye 26 encircling the upper threaded end of a rod 27 disposed between the incubator casing and the heating drum and having its lower end hinged or pivoted to the upper end of a link 28 which has its lower end loosely connected to a U-shaped lever 29 at the center of the latter. The lever 29 is fulcrumed at its ends upon the base 30 of the lamp or heater, and the side members of the lever pass through the open forked arms 31 of angle levers which are fulcrumed also upon the lamp base 30, as indicated at 32, and have upstanding arms 33 which engage in eyes 34 formed at the outer ends of push rods 35 which are slidably fitted through the burner tube 12 and pass between the wick tubes 36 of the burner, as most clearly shown in Fig. 13. To each rod 35 is secured a cut-off 37 which extends from the rod upwardly and then across and then downwardly at the outer side of the respective wick tube so that if the rods be moved inwardly the cut-offs will be moved toward the center of the respective wicks and will thereby reduce the working area of the same and diminish the flame, thereby reducing the heat given out by the lamp. Normally, of course, the cut-off plates or flame reducers will be located at or beyond the ends of the wick tubes so that charring, and consequently clogging, will be minimized, if not entirely eliminated. The thermostat will be adjusted to operate at predetermined high and low temperatures, and when the temperature within the incubator reaches the predetermined high degree, the thermostat will expand and rock the lever 20 so that the upper upturned end of the same will move upwardly. The eye 26 of said end of the lever bears against the underside of a wing nut 38 which is mounted on the upper extremity of the link 27 so that when the end 25 moves upwardly the link will be raised. The upward movement of the link 27 will be imparted directly to the link or connecting rod 28, and by the latter, will be transmitted to the lever 29 so that said lever will be rocked upwardly about its fulcrum. When the lever 29 is rocked upwardly, the side members thereof, through their engagement with the forks 31, will rock the angle levers so that the arms 33 thereof will push the rods 35 inwardly and thereby carry the flame-reducing plates 37 inwardly over the wick tubes. The flames will, consequently, be reduced, and this condition will exist until the temperature within the incubator drops to the predetermined low degree, whereupon a reverse action will occur and the flame reducers will be moved outwardly, thereby permitting the flame to spread across the entire ends of the wicks. I thus provide a novel and efficient means for regulating the temperature of the incubator automatically without causing escape of heat from the incubator and, therefore, economize in the use of fuel. The lever 29 and rods 35 may be easily dismounted and removed when the lamp and the burners are to be cleaned.

In connection with each wick tube, there is a wick-adjusting device, indicated at 39, which may be of any well-known form but is arranged at the outer side of the wick tube so as to avoid interference with the flame-reducing devices. The lamp base 30 may also be of any known or approved form and is equipped with a filling tube 40 whereby oil may be readily fed into the lamp base to fill the same. The lamp or heater is supported by a shelf or platform 41 which is slidably mounted below the body or casing 1. This shelf or platform is a flat plate or board passed through U-shaped hangers 42 secured to and depending from the bottom of the incubator body and movable through the same in an obvious manner. Stops or cleats 43 are provided on the underside of the shelf 41 at the outer end of the same and between the ends to limit the movement of the shelf as it is moved inwardly or outwardly and prevent its being displaced. A stop bracket 44 is provided on the upper side of the shelf at the inner end thereof and bears against the bottom of the incubator housing, as clearly shown in Fig. 2, so that when the shelf is drawn out and the heater is resting upon its outer end, the shelf cannot be tilted so as to drop the heater. When the apparatus is not in use, the shelf is pushed inwardly so that it will be out of the way under the incubator.

The eggs are placed upon trays within the incubator and the trays are inserted in or withdrawn from the incubator body through doorways or openings provided in the front thereof. These doorways or openings are normally closed by a door 45 which is hingedly connected at its lower edge to the incubator body at the bottom of the same, as indicated at 46. A door 47 is also provided at the back of the incubator body and likewise hinged at its lower edge to the housing or body to open downwardly. Secured to the doors at the ends of the same are brackets 48 which extend slightly past the ends of the housing or body and have pivoted thereon the outer ends of links or connecting rods 49, said rods 49 extending inwardly and having their inner ends pivoted to the ends of a lever 50 which is pivoted midway its ends upon the adjacent end wall of the incubator. When the front door 45 is swung downwardly, the motion will be transmitted through the links and levers to the back door so that it will be simultaneously swung downwardly and fresh air will then be admitted to the interior of the apparatus from both sides, and the desired venting of the apparatus will be quickly accomplished. Openings 51 are formed through the door 45 adjacent its lower edge and may be provided in any number as judgment may dictate, and similar openings 52 are provided in the rear wall of the incubator body or housing above the rear door 47, as shown clearly in Fig. 3. Damper slides 53 are mounted upon the front door 45 and have openings 54 therethrough adapted to register with the openings in the door so that the effective area of the latter may be adjusted. I thus provide for a steady ventilation of the incubator while it is in use without liability of the eggs to be unduly chilled. To guard against leakage of air around the edges of the doors, I provide fasteners consisting each of a bracket or keeper 55 secured upon the side of the body or casing 1 immediately adjacent the door opening and having one end offset so as to define a triangular space between the bracket and the side of the incubator, as will be understood upon reference to Fig. 4. Latches 56 are pivoted upon the doors adjacent the upper edges of the same and are provided with handles 57 whereby they may be easily manipulated. The latches may be of any convenient form and are so disposed that when they are turned upwardly, as shown in Fig. 1, they will engage within the space behind the brackets and bind therein so that the door will be driven firmly home to its seat and closed air-tight thereagainst. If the latches be swung downwardly, they will, of course, move out of engagement with the keepers and will permit the doors to be opened.

Disposed transversely within the incubator housing are angle bars 58 which are secured to the end walls of the housing and on opposite sides of a central partition 59 and serve as guides and supports for the trays. The egg trays consist of foraminous sides 60 having their edges bound by sheet metal strips 61 and having wide sheet metal strips 62 around their lower edge portions. The bottoms 63 of the egg trays are of similar foraminous material, having their edges bound by sheet metal strips, as indicated at 64, and, as shown most clearly in Fig. 6, the bottoms are composed of two or more sections the combined widths of which are less than the width of the tray, so that after the eggs begin to hatch the bottoms may be moved laterally apart and an opening thereby provided along the center of the tray through which the chicks may drop into the nursery trays 65 placed therebelow. It is, of course, desirable to prevent the eggs shifting over the tray and tending to collect at one end of the same, and I, therefore, provide partitions 66 which are of foraminous material, having their edges bound with sheet metal and removably engaged at their ends in cleats or guide brackets 67 provided on the side walls of the tray, as clearly shown in Figs. 7 and 8. In the drawings I have shown each tray as provided with two partitions. A greater number of partitions may be provided if desired, but there should in all cases be at least two. I also provide tubular guides 68 on the sides of the egg trays, adjacent their forward ends, and in these guides are engaged the ends 69 of U-shaped brackets or frames which pass across the trays and have thermometer holders 70 pivotally mounted thereon. The thermometer holders are preferably in the form of flat plates adapted to rest at one edge upon stops 71 when the eggs are being turned, so that they will be supported out of the way, and constructed at their free ends each with a notch 72 to accommodate the bulb 73 of the thermometer tube, so that when the holder is swung downwardly the bulb may rest upon an egg and thereby measure the temperature of the eggs rather than the temperature of the incubator.

It is well known that it is desirable to turn the eggs at intervals during the hatching period, and, for this purpose, I provide a very simple, inexpensive and efficient egg turner, shown in detail in Fig. 9. This egg turner consists of a plate 74 which ordinarily rests upon the bottom of the egg tray at the rear end of the same and has lugs or small projections 75 struck up from its upper side. The plate is provided with a central shank or stem projecting from its front edge, as shown at 76, and to said stem is pivoted a handle bar 77 adapted to extend through the front of the incubator and equipped with rings 78 in which the fingers of the operator may be conveniently engaged. The partitions 66 have openings 79 formed through the lower edges of their reinforcements at the centers of the same to accommodate the handle 77, as will be understood upon reference to Fig. 3. The handle bar 77 is inverted U-shape in cross section and rests upon and spans the flanges on the tray bottoms at the inner meeting sides of the same and holds them together, as shown in Fig. 6. When the eggs hatch out, the turner is removed and the tray bottoms then may be moved apart.

When the eggs are to be turned, the door 45 is opened and the fingers engaged in the rings 78 to pull the turner forward under the eggs. The frictional engagement between the eggs and the projections 75 of the turner plate 74 will cause the eggs to rotate and they will be prevented from being drawn forwardly by reason of the foremost eggs bearing against the several partitions 66. When the turner is drawn forward, the handle 77 may be swung downwardly about its pivotal connection with the stem 76 so that it will not be in the way of the attendant or other persons passing the incubator. When the turner is pushed back and returned to its normal position, the eggs will be rotated in an opposite direction and the desired results will have been accomplished.

The nursery trays 80 are supported directly upon the bottom of the incubator housing below the respective hatching or egg trays and are of like construction, except that the bottoms of the nursery trays are not secured to the upper portions thereof and, consequently, cleaning of the trays is facilitated.

When the eggs are to be cooled, as must ordinarily be done twice a day, it is obviously desirable to avoid waste of the heat which will be given off from the heating tank, and, for this purpose, I provide shields or protectors 81 which consist of flat plates adapted to be placed over the egg trays when the doors are opened. These plates are imperforate and will prevent the downward flow of the hot air so that it will be held in the upper portion of the incubator body, and, consequently, when the doors are closed, the hatching process will be immediately resumed. When these plates are not in use, they may be placed upon the top of the incubator, and it should be noted that the top of the body is flat and no operating parts project therethrough, so that the shields or plates 81 and any trays which are not in use may be merely placed upon the top of the incubator body where they will be easily accessible, special holders being unnecessary. When the heat-saving shields are in use, the upturned front ends thereof bear against the top jamb of the front door, as shown in Fig. 11, and no heat can get to the eggs, the air passing over all the eggs and cooling them equally. The eggs are turned at the cooling periods.

Having thus described the invention, I claim:

1. In an incubator, a heater including a wick tube, a flame reducer slidably mounted over the upper end of the wick tube, a fulcrum lever operatively connected with the flame reducer, and thermostatic means for rocking said fulcrum lever whereby the flame reducer will be shifted in a straight line toward or from the center of the wick tube.

2. In an incubator, a heater including wick tubes, flame reducers slidably mounted over the upper ends of the wick tubes and provided with depending portions embracing said wick tubes, a fulcrum lever operatively connected with the flame reducers, and thermostatic means for rocking said fulcrum lever whereby the flame reducers will be shifted laterally in a straight line toward or from the centers of the wick tubes.

3. In an incubator, a heater including wick tubes, flame reducers slidably mounted over the upper ends of the wick tubes, rods extending laterally from the flame reducers, angle levers pivotally mounted at the sides of the heater and engaging said rods, a fulcrum lever at one side of the flame reducers and engaging the angle levers, a thermostatically controlled lever, and a link connection between the thermostatically controlled lever and the fulcrum lever.

4. In an incubator, a heater, wick tubes within the heater, flame-reducing plates slidably mounted adjacent the wick tubes and extending across the tops of the same, slide rods secured to said flame-reducing plates and projecting through the sides of the heater, angle levers mounted at the sides of the heater and having upstanding arms engaged with said rods and outwardly projecting forks, a U-shaped lever fulcrumed at its ends at the side of the heater and having its side portions engaged in said forks, and means connected with said U-shaped lever and controlled by the temperature in the body of the incubator for rocking said lever and adjusting the flame-reducing plates.

WILLIAM E. SKELTON. [L. S.]